United States Patent
Suzuki et al.

[11] Patent Number: 6,139,620
[45] Date of Patent: Oct. 31, 2000

[54] CALCIUM SILICATE BOARD AND METHOD OF MANUFACTURING SAME

[75] Inventors: Seishiro Suzuki, Kanagawa; Masato Sakiyama, Ibaraki; Takuya Asami, Ibaraki; Tomoki Iwanaga, Ibaraki; Yasuhide Oshio, Ibaraki; Shigemitsu Shiromoto, Ibaraki; Toru Sugiyama, Ibaraki; Masaaki Oda, Ibaraki, all of Japan

[73] Assignee: ASK Corporation, Yokohama, Japan

[21] Appl. No.: 09/011,475

[22] PCT Filed: Jun. 25, 1996

[86] PCT No.: PCT/JP96/01757

§ 371 Date: Feb. 18, 1998

§ 102(e) Date: Feb. 18, 1998

[87] PCT Pub. No.: WO97/49645

PCT Pub. Date: Dec. 31, 1997

[51] Int. Cl.[7] .............................. B28B 1/14; B28B 1/26; C04B 38/00
[52] U.S. Cl. ............... 106/672; 106/679; 106/286.6; 106/287.1; 264/86; 264/87; 264/333
[58] Field of Search ................ 264/333, 86, 87; 106/672, 286.6, 287.1, 679

[56] References Cited

U.S. PATENT DOCUMENTS

| | | | |
|---|---|---|---|
| 4,128,434 | 12/1978 | Pusch | 106/120 |
| 4,144,121 | 3/1979 | Otouma et al. | 106/120 |

FOREIGN PATENT DOCUMENTS

| | | |
|---|---|---|
| 49-008518 | 1/1974 | Japan . |
| 52-105926 | 9/1977 | Japan . |
| 52-135330 | 11/1977 | Japan . |
| 8-143379 | 6/1996 | Japan . |
| 0 678 488 | 10/1995 | United Kingdom . |

OTHER PUBLICATIONS

Patent Abstracts of Japan, vol. 018, No. 625 (C–1279), Nov. 29, 1994 (11–29–94) & JP 06 239672 A (NKK Corp), Aug. 30, 1994 (08–30–1994) *Abstract*.

Patent Abstracts of Japan, vol., 017, No. 436 (C–1096), Aug. 12, 1993 (08–12–1993) & JP 05 097 498 A (Nichias Corp), Apr. 20, 1993 (04–20–93) *Abstract*.

*Primary Examiner*—Karen Aftergut
*Attorney, Agent, or Firm*—Oblon, Spivak, McClelland, Maier & Neustadt, P.C.

[57] ABSTRACT

A method of manufacturing a calcium silicate board having a bulk specific gravity of approximately 0.5 to 0.8, which method achieves a decrease in the bulk specific gravity and an increase in the matrix strength of the board without impairing productivity, and the calcium silicate board obtained by this method. The method is characterized in that a material slurry comprising 5 to 30 wt % of calcium silicate hydrate slurry as a solid component, 17 to 50 wt % of calcareous material, 13 to 45 wt % of silica containing material, 2 to 8 wt % of fiber material, and 5 to 40 wt % of inorganic fillers is formed through conventional processes and the obtained molded body is subjected to a hydrothermal reaction in a pressure container.

9 Claims, No Drawings

CALCIUM SILICATE BOARD AND METHOD OF MANUFACTURING SAME

INDUSTRIAL FIELD OF THE INVENTION

The present invention relates to a method of manufacturing a calcium silicate board and the calcium silicate board obtained by the method.

RELATED ART AND PROBLEMS

Conventionally, calcium silicate boards have been widely used for building materials, in particular, for interior materials because of such characteristics as being light, excellent in workability and dimensional stability, and non-combustible.

Calcium silicate boards used for building material are formed using a forming process such as the Hatschek sheet machine process a press mold process or a mono-layer mold process and are manufactured as follows: a molded body is formed from a calcareous material, a silica containing material, reinforcing fibers and fillers, such as light-weight aggregate, then, in general, subjected to curing reaction by saturated water vapor in a pressure container. Generally, the bulk specific gravity of the calcium silicate boards is in a range of from 0.7 to 1.2.

Since calcium silicate boards are used as an interior material, such as ceiling materials and wall materials, lightening the boards is desirable, however, according to the above methods it is necessary to mix a considerable amount of light-weight aggregate so as to achieve a bulk specific gravity of 0.5 to 0.8, resulting in a decrease in the specific strength of the boards.

In particular, when a light-weight calcium silicate board having a bulk specific gravity of 1.0 or less is manufactured according to the Hatschek sheet machine process, the following problems sometimes occur: because of the low strength and large water content of the molded body before hydrothermal reaction, the redundant water thermally expands during hydrothermal reaction or the vapor pressure increases, resulting in interlayer peeling or bursting.

To avoid the above problems, in some methods, a molded body is pressed after forming then subjected to hydrothermal reaction or a molded body is tightened by a turn-buckle during the hydrothermal reaction. However, in accordance with these methods, such problems occur that the bulk specific gravity increases and more labor is required for manufacturing.

In addition, Japanese Patent Laid-Open No. 6-287083 discloses a method of removing the redundant water, though this method cannot be commonly used because a specific pressure container or a vapor heater is necessary.

Further, conventionally, a material slurry containing a calcareous material and an amorphous silica containing material is heated at a normal pressure for gelation so as to achieve a light-weight board. However, according to this method, the board strength is inevitably reduced, and further, the material is so soft that it is readily shaved during polishing. Therefore, cellulose fibers become extremely fuzzy such that the surface smoothness is impaired when the board is used after coating.

Moreover, another method is disclosed in Japanese Patent Laid-Open Nos. 52-105926 and 52-135330, wherein calcium silicate boards exhibiting excellent strength are obtained by adding a xontlite slurry, which is a kind of calcium silicate hydrate, or a crystalline calcium slurry. Since productivity decreases according to these methods, improvement is required from a viewpoint of manufacturing costs.

Additionally, in Japanese Patent Laid-Open Nos. 5-213657 and 7-41354, the inventors of the present invention have already disclosed a method of adding both a gelatinized slurry, comprising a calcareous material and an amorphous silica containing material, and a crystalline calcium silicate hydrate slurry. However, in the case of a board laminated by the Hatschek sheet machine process, some problems, such as interlayer peeling or bursting, occur even in this method of adding gels.

Furthermore, Japanese Patent Publication No. 58-30259 discloses a method of manufacturing a calcium silicate molded body characterized by the following: a silica containing material and a calcareous material are dispersed in water of which the amount by weight is 15 times or more than that of the materials as a solid component; the resultant mixture is heat-reacted at 130° C. or more under a pressurized condition so as to form an aqueous slurry, which has a sedimentation volume of 15 $cm^3/g$ or more, contains calcium silicate composed of C—S—H or tobermorite; to the aqueous slurry asbestos is added and subjected to dewatering and forming; and the calcium silicate hydrate is transformed by water vapor curing under a pressurized condition. However, the calcium silicate molded body obtained by this method is used as a heat storing material or a heat insulating material, and according to an embodiment of this Publication, the bulk specific gravity thereof is as small as 0.1 to 0.2 $g/cm^3$. Thus the calcium silicate molded body cannot be employed for a calcium silicate board used as a building material.

Therefore, an object of the present invention is to provide a method of manufacturing a calcium silicate board having a bulk specific gravity of approximately 0.5 to 0.8, which method achieves a decrease in the bulk specific gravity and an increase in the matrix strength without impairing productivity, and the calcium silicate board obtained by the method.

Another object of the present invention is to provide a method of manufacturing a calcium silicate board having a bulk specific gravity of 1.0 or less, in which the foregoing problems are solved such that peeling or bursting during the hydrothermal reaction is eliminated because the strength of a molded body (green sheet) is improved by using a material having an excellent reactivity with a calcareous material and by primary curing proceeded before the hydrothermal reaction.

Further, in a method of manufacturing a calcium silicate board having a bulk specific gravity of 0.70 or less using a gel comprising a calcareous material for gelation and a silica containing material for gelation, another object of the present invention is to provide a method of manufacturing a calcium silicate board having a bulk specific gravity of 0.70 or less and an excellent interlayer peel strength, in which the foregoing problems are solved by improving the strength of a molded body by primary curing proceeded before hydrothermal reaction so as to avoid peeling or bursting during the hydrothermal reaction.

MEANS FOR SOLVING THE PROBLEM

The present invention relates to a method of manufacturing a calcium silicate board comprising a step of forming a material slurry comprising 5 to 30 wt % of calcium silicate hydrate slurry as a solid component, 17 to 50 wt % of calcareous material, 13 to 45 wt % of silica containing material, 2 to 8 wt % of fiber material and 5 to 40 wt % of inorganic fillers by conventional processes, and a step of hydrothermally reacting the obtained molded body in a pressure container (hereinafter referred to as the first aspect of the present invention).

Further, the present invention relates to a calcium silicate board manufactured according to the above method, which calcium silicate board has a bulk specific gravity ranging from 0.5 to 0.8 and an abrasion index ranging from 0.3 to 2 (hereinafter referred to as the second aspect of the present invention).

In the above, the abrasion index was evaluated according to JIS K7204 such that the weight loss was obtained from a test of 1,000 cycles at a load of 1,000 g using an abrasion ring of CS-10 and calculated from the following formula: abrasion index=weight loss (g)/bulk specific gravity.

Furthermore, the present invention relates to a method of manufacturing a light-weight calcium silicate board (hereinafter referred to as a calcium silicate board) comprising a step of forming a material slurry into a prescribed shape, the material slurry comprising, as a solid component, 17 to 50 wt % of calcareous material, 15 to 45 wt % of silica containing material, 2 to 8 wt % of fiber material and 5 to 40 wt % of inorganic fillers, and a step of hydrothermally reacting the obtained molded body in a pressure container, wherein 2 to 20 wt % of at least one kind of amorphous silica containing material and silicate material, each having a specific surface area of 1 $m^2$/g or more, is used as a portion of the silica containing material; and, before the hydrothermal reaction, the molded body is subjected to primary curing under conditions where (curing temperature—15)×curing time≧120° C.·hr. (hereinafter referred to as the third aspect of the present invention).

In addition, the present invention relates to a method of manufacturing a calcium silicate board having a bulk specific gravity of 0.70 or less comprising a step of forming a material slurry in layers by the Hatschek sheet machine process, the material slurry comprising, as a solid component, 5 to 35 wt % of calcareous material, 5 to 4 wt % of silica containing material, 2 to 8 wt % of fiber material, 5 to 40% of inorganic fillers, and a gel obtained from 2 to 20 wt % of calcareous material for gelation and 3 to 25 wt % of silica containing material for gelation, and a step of hydrothermally reacting the obtained molded body in a pressure container, wherein 2 to 20 wt % of at least one kind of amorphous silica containing material and silicate material, each having a specific surface area of 1 $m^2$/g or more, is used as a portion of the silica containing material; and, before the hydrothermal reaction, the molded body is subjected to primary curing under conditions where (curing temperature—15)×curing time≧120° C.·hr. so that the flexural strength of the molded body under a wet condition is 7 kg/$cm^2$ or more and is 1.3 times higher than that before primary curing (hereinafter referred to as the fourth aspect of the present invention).

In addition, the present invention relates to a method of manufacturing a calcium silicate board having a bulk specific gravity of 0.70 or less comprising a step of forming a material slurry in layers by the Hatschek sheet machine process, the material slurry comprising, as a solid component, 5 to 35 wt % of calcareous material, 5 to 40 wt % of silica containing material, 2 to 8 wt % of fiber material, 5 to 40% of inorganic fillers, and a gel obtained from 2 to 20 wt % of calcareous material for gelation and 3 to 25 wt % of silica containing material for gelation, and a step of hydrothermally reacting the obtained molded body in a pressure container, wherein 2 to 20 wt % of at least one kind of amorphous silica containing material and silicate material, each having a specific surface area of 1 $m^2$/g or more, is used as a portion of the silica containing material; further, the material slurry contains 20 wt % or less of a curing agent selected from the group consisting of Portland cement, alumina cement and granulated blast furnace slag, and, before the hydrothermal reaction, the molded body is subjected to primary curing under conditions where (curing temperature—10)×curing time≧120° C.·hr. so that the flexural strength of the molded body under a wet condition is 7 kg/$cm^2$ or more and is 1.3 times higher than that before primary curing (hereinafter referred to as the fifth aspect of the present invention).

Moreover, the present invention relates to a method of manufacturing a calcium silicate board having a bulk specific gravity of 0.70 or less comprising a step of forming a material slurry in layers by the Hatschek sheet machine process, the material slurry comprising, as a solid component, 5 to 35 wt % of calcareous material, 5 to 40 wt % of silica containing material, 2 to 8 wt % of fiber material, 5 to 40% of inorganic fillers, and a gel obtained from 2 to 20 wt % of calcareous material for gelation and 3 to 25 wt % of silica containing material for gelation, and a step of hydrothermally reacting the obtained molded body in a pressure container, wherein the material slurry contains 20 wt % or less of a curing agent selected from the group consisting of Portland cement, alumina cement and granulated blast furnace slag; and, before the hydrothermal reaction, the molded body is subjected to primary curing under conditions where (curing temperature—10)×curing time≧120° C.·hr. so that the flexural strength of the molded body under a wet condition is 7 kg/$cm^2$ or more and is 1.3 times higher than that before primary curing (hereinafter referred to as the sixth aspect of the present invention).

Additionally, the present invention relates to a calcium silicate board having a bulk specific gravity of 0.70 or less manufactured according to the above methods, wherein the calcium silicate board has an interlayer peel strength of 3% or more of the flexural strength (hereinafter referred to as the seventh aspect of the present invention).

BEST MODE FOR CARRYING OUT THE INVENTION

A method of manufacturing a calcium silicate board according to the first aspect of the present invention is characterized in that a calcium silicate hydrate slurry essentially consisting of an amorphous material and having a sedimentation volume of 5 to 14 ml/g is used as a calcium silicate hydrate slurry, which slurry is obtained by a hydrothermal reaction of a slurry, comprising a calcareous material and a crystalline silica containing material of which the Ca/(Si+Al) molar ratio is 0.3 to 0.8, and water under conditions that the reaction rate of a crystalline silica containing material is 40 to 80% at a saturated vapor pressure.

A calcium silicate hydrate slurry essentially consisting of an amorphous material according to the first aspect of the present invention is obtained by hydrothermally reacting a slurry, comprising a calcareous material and a crystalline silica containing material of which the Ca/(Si+Al) molar ratio is 0.3 to 0.8. The hydrothermal reaction proceeds for 3 to 8 hours at a water ratio of 10 to 20, at a temperature of 120 to 200° C., at a reaction rate of crystalline silica containing material of 40 to 80% and at a saturated vapor pressure.

Calcium hydroxide and quicklime are examples of a calcareous material. Silica sand and sintered diatomaceous earth are examples of a crystalline silica containing material. When the Ca/(Si+Al) molar ratio of the foregoing slurry is less than 0.3, effects on decreasing the specific gravity and increasing the matrix strength are undesirably reduced because of a small production amount of calcium silicate hydrate. Whereas if the ratio exceeds 0.8, undesirably, the moisture content is raised because of an increase in sedimentation volume, thus impairing productivity.

Further, when the reaction rate of crystalline silica containing material is less than 40%, effects on decreasing the specific gravity and increasing the matrix strength are undesirably reduced because of a small production amount of calcium silicate hydrate. Whereas if the rate exceeds 80%, undesirably, the moisture content is raised because of an increase in sedimentation volume, thus impairing productivity. The crystal phase of the crystalline silica containing material is quartz or cristobalite and the reaction rate can be estimated by the powder X-ray diffraction method according to the standard addition method. The peak of (10·1) and (101) are respectively used when the crystal phase is quartz and cristobalite, respectively.

A calcium silicate hydrate slurry, essentially consisting of an amorphous material produced as above, has a sedimentation volume in a range of from 5 to 14 ml/g. When this calcium silicate hydrate slurry is used as a material of a calcium silicate board, effects on reducing the specific gravity and increasing the matrix strength are achieved without decreasing productivity. The sedimentation volume is obtained by putting 7 g of calcium silicate hydrate slurry, essentially consisting of an amorphous material, as a solid component into a 200 ml measuring cylinder, diluted it to 200 ml with water, followed by letting it stand for 3 hours. The volume thereof is then measured.

Further, the fundamental composition of a material slurry used for a method of manufacturing a calcium silicate board according to the first aspect of the present invention is as follows: 5 to 30 wt % of the above calcium silicate hydrate slurry, essentially consisting of an amorphous material, as a solid component; 17 to 50 wt % of calcareous material; 13 to 45 wt % of silica containing material; 2 to 8 wt % of fiber material; and 5 to 40 wt % of inorganic fillers. After forming, the material slurry is subjected to the hydrothermal reaction in a pressure container and formed into a calcium silicate board through conventional processes. The hydrothermal reaction proceeds in a pressure container under saturated water vapor at a temperature of 150 to 200° C. and, preferably at 170 to 190° C. for 5 to 20 hours and, more preferably, for 8 to 12 hours.

When the content of the calcium silicate hydrate slurry essentially consisting of an amorphous material is less than 5 wt % as a solid component, the effect on decreasing the specific gravity is small, whereas if the content exceeds 30 wt % as a solid component, the bulk specific gravity decreases undesirably such that the calcium silicate-board strength becomes insufficient for a building material.

For example, calcium hydroxide and quicklime can be used as a calcareous material. A calcareous material content of less than 17 wt % or more than 50 wt % undesirably causes a decrease in the flexural strength and an increase in the dimensional change rate due to water absorption.

In addition, silica sand, fly ash, diatomaceous earth, silicon dust, white carbon, zeolite, and montmorillonite are examples of a silica containing material. A silica containing material content of less than 15 wt % or more than 45 wt % undesirably causes a decrease in the flexural strength and an increase in the dimensional change rate due to water absorption.

Moreover, cellulose fibers, polypropylene, vinylon, glass fibers and carbon fibers are examples of a fiber material. A fiber material content of less than 2 wt % is not preferable because the flexural strength decreases. Whereas, a fiber material content of more than 8 wt % undesirably causes a loss of the non-combustibility. Additionally, when polypropylene, vinylon, glass fibers or carbon fibers are used, the preferable content thereof is 5 wt % or less.

Further, perlite, wollastonite, mica, talc, calcium carbonate and gypsum are examples of inorganic fillers. An inorganic filler content of less than 5 wt % is not preferable because it causes an increase in the dimensional change rate due to water absorption. An inorganic filler content of more than 40 wt % is not preferable, since it decreases the flexural strength.

In addition, as a forming method, any conventional forming process, including the Hatschek sheet machine process, mold press process, and mono-layer mold process, can be used.

The above calcium silicate board according to the second aspect of the present invention has excellent matrix strength and abrasion resistance in spite of the fact that the bulk specific gravity thereof is in a range of from 0.5 to 0.8.

The fundamental composition of a material slurry used for a method of manufacturing a calcium silicate board according to the third aspect of the present invention is a conventional composition, as follows: as a solid component, 17 to 50 wt % of calcareous material, 15 to 45 wt % of silica containing material; 2 to 8 wt % of fiber material; and 5 to 40% of inorganic fillers.

The same materials as above can be used as a calcareous material. A calcareous material content of less than 17 wt % or more than 50 wt % is not preferable because it causes a decrease in the flexural strength and an increase in the dimensional change rate due to water absorption.

In addition, silica sand, fly ash, etc., can be used as a silica containing material. A silica containing material content of less than 15 wt % or more than 45 wt % is not preferable because it causes a decrease in the flexural strength and an increase in the dimensional change rate due to water absorption.

Moreover, the same materials as above can be used as a fiber material. A fiber material content of less than 2 wt % is not preferable because it decreases the flexural strength, and a fiber material content of more than 8 wt % undesirably causes a loss of the non-combustibility. Additionally, when polypropylene, vinylon, glass fibers or carbon fibers are used, it is necessary to set the content thereof to 5 wt % or less.

Further, the same materials as mentioned above can be used as inorganic fillers. An inorganic filler content of less than 5 wt % is not preferable because it causes an increase in the dimensional change rate due to water absorption. An inorganic filler content of more than 40 wt % is not preferable since it decreases the flexural strength.

The first novel characteristic of the third aspect of the present invention is that an amorphous silica containing material or a silicate material of which the specific surface area is 1 $m^2/g$ or more is used as a portion of a silica containing material of a material slurry having the foregoing composition. "The specific surface area" in this description is estimated by the gaseous $N_2$ absorption method. It is not preferable that the specific surface area of the amorphous silica containing material or the silicate material be less than 1 $m^2/g$, since a green sheet cannot obtain sufficient strength before the hydrothermal reaction due to poor reactivity.

Further, the content of the amorphous silica containing material or the silicate material having a specific surface area of 1 $m^2/g$ or more is in a range of from 2 to 20 wt %. A content of less than 2 wt % is not preferable because of poor strength reproducibility, and a content of more than 20 wt % is not preferable because it reduces the freeness, resulting in a decrease in productivity. When a material having a specific surface area of 1 to 10 m²/g is used, the preferable content thereof is 10 wt % or more, in the case of a material having a specific surface area of 10 to 100 m²/g, the preferable content thereof is 5 wt % or more, and in the case of a material having a specific surface area of 100 m²/g or more, the preferable content thereof is 2 wt % or more.

Examples of an amorphous silica containing material having a specific surface area of 1 m²/g or more are diatomaceous earth, silicon dust, fly ash, and white carbon. Additionally, examples of a silicate material having a specific surface area of 1 m²/g or more are zeolite, pyrophyllite, allophane, montmorillonite mineral, chlorite mineral, and attapulgite. Two or more kinds of these materials can be used together.

The second novel characteristic of the third aspect of the present invention is that a green sheet (molded body) is not subjected to the hydrothermal reaction as it is but undergoes primary curing, which green sheet is obtained such that a material slurry composed of the foregoing material compositions is formed into a prescribed shape by, for instance, the Hatschek sheet machine process. Primary curing proceeds under the following conditions: (curing temperature—15)× curing time≧120° C.·hr. The primary curing conditions of less than 120° C.·hr are not preferable because a green sheet cannot obtain sufficient strength due to a shortage of curing. Primary curing requires a curing temperature of more than 15° C. and, preferably, it proceeds under conditions of 240° C.·hr or more in a curing temperature range of 30 to 80° C.

After the afore-mentioned primary curing, the green sheet may be subjected to a conventional hydrothermal reaction and formed into a calcium silicate board through conventional processes. The hydrothermal reaction can proceed in a pressure container under saturated water vapor at a temperature of 150 to 200° C. and, preferably at 170 to 190° C. for 5 to 20 hours and, more preferably, for 8 to 12 hours.

According to a manufacturing method incorporated in the third aspect of the present invention, a calcium silicate board having a bulk specific gravity of 1.0 or less can be obtained.

The fundamental composition of a material slurry used for a method of manufacturing a calcium silicate board according to the fourth to sixth aspects of the present invention is a conventional composition, as follows: 5 to 35 wt % of calcareous material, 5 to 40 wt % of silica containing material; 2 to 8 wt % of fiber material; 5 to 40% of inorganic fillers, and a gel obtained from 2 to 20 wt % of calcareous material for gelation and 3 to 25 wt % of silica containing material for gelation. In addition, the foregoing material slurry may contain a curing agent up to 20 wt %.

The same materials as above mentioned can be used as a calcareous material. A calcareous material content of less than 5 wt % or more than 35 wt % is not preferable because it causes a decrease in the flexural strength and an increase in the dimensional change rate due to water absorption.

In addition, silica sand, fly ash, etc., can be used as a silica containing material. A silica containing material content of less than 5 wt % or more than 40 wt % is not preferable because it causes a decrease in the flexural strength and an increase in the dimensional change rate due to water absorption.

Moreover, the same materials as above mentioned can be used as a fiber material. A fiber material content of less than 2 wt % is not preferable because it decreases the flexural strength, and a fiber material content of more than 8 wt % undesirably causes a loss of non-combustibility. Additionally, when polypropylene, vinylon, glass fibers or carbon fibers are used, it is necessary to set the content thereof to 5 wt % or less.

Further, the same materials as above can be used as inorganic fillers. An inorganic filler content of less than 5 wt % is not preferable because it causes an increase in the dimensional change rate due to water absorption. An inorganic filler content of more than 40 wt % is not preferable, since it decreases the flexural strength.

According to a method incorporated in the fourth to sixth aspects of the present invention, an amorphous silica containing material or a silicate material of which the specific surface area is 1 m²/g or more is used as a portion of a silica containing material of a material slurry having the foregoing composition, similarly to the third aspect of the present invention.

The content of an amorphous silica containing material or a silicate material of which the specific surface area is 1 m²/g or more is in a range of from 2 to 20 wt %, as is similar to the third aspect of the present invention.

The same material as above can be used as an amorphous silica containing material having a specific surface area of 1 m²/g or more.

In a method incorporated in the fourth to sixth aspects of the present invention, it is essential to use a gel obtained by gelation of 2 to 20 wt % of calcareous material for gelation and 3 to 25 wt % of silica containing material for gelation, for instance, at 75 to 95° C. for 1.5 to 4 hours. A calcium silicate board having a bulk specific gravity of 0.7 or less can be readily obtained by using the foregoing gel for a material slurry for producing the calcium silicate board. Neither the calcareous material for gelation nor the silica containing material for gelation are limited to specific kinds of materials and any conventional material can be used. For example, calcium hydroxide and quicklime can be used as a calcareous material for gelation. Silicon dust, fly ash, white carbon and the like can be used as a silica containing material for gelation.

Moreover, a curing agent may be added to a material slurry according to the fourth to sixth aspects of the present invention. For example, Portland cement, alumina cement and granulated blast furnace slag can be used as a curing agent for improving the flexural strength by primary curing. When using a curing agent, the content thereof is 20 wt % or less and, preferably, in a range of from 3 to 20 wt %. When the content exceeds 20 wt %, the bulk specific gravity of a calcium silicate board increases and, undesirably, it becomes impossible to produce a calcium silicate board having a bulk specific gravity of 0.70 or less. If the content is less than 3 wt %, the effect of adding a curing agent is occasionally impeded.

According to the fourth to sixth aspects of the present invention, a material slurry of the above kind is formed in layers by the Hatschek sheet machine process, which slurry has a gel as a portion thereof, contains or does not contain an amorphous silica containing material or a silicate material having a specific surface area of 1 m²/g or more, and contains or does not contain a curing agent. The present invention is not limited to this Hatschek sheet machine process, and any conventional process can be used.

The novel characteristic of the fourth to sixth aspects of the present invention is that a molded body obtained in the above manner is not subjected to the hydrothermal reaction as it is but undergoes primary curing, similar to the third aspect of the present invention. If the material slurry does not contain a curing agent, primary curing proceeds under the following conditions: (curing temperature—15)×curing time≧120° C.·hr. The primary curing conditions of less than 120° C.·hr are not preferable because a molded body cannot obtain sufficient strength due to a shortage of curing. Primary curing requires a curing temperature of 15° C. or more and, preferably, it proceeds under conditions of 240° C. ·hr or more in a curing temperature range of 30 to 80° C. Further, when the material slurry contains a curing agent, primary curing can proceed under the following conditions: (curing temperature—10)×curing time≧120° C.·hr. This is because the reaction using a curing agent readily proceeds at a low temperature as compared with a calcareous material and silica containing material, in particular, an amorphous silica containing material and silicate material. In this case, primary curing requires a curing temperature of 10° C. or more and, preferably, it proceeds under conditions of 240° C.·hr or more in a curing temperature range of 25 to 80° C.

By employing the above-mentioned primary curing it is possible to increase the flexural strength of a molded body under wet conditions to 7 kg/cm² or more and to 1.3 times higher than that before primary curing.

After the afore-mentioned primary curing, the molded body can be subjected to a conventional hydrothermal reaction and formed into a calcium silicate board through conventional processes. The hydrothermal reaction can proceed in a pressure container under saturated water vapor at a temperature of 150 to 200° C. and, preferably at 170 to 190° C. for 5 to 20 hours and, more preferably, for 8 to 12 hours.

According to a manufacturing method incorporated in the seventh aspect of the present invention, a calcium silicate board having a bulk specific gravity of 0.70 or less is obtained and it reveals a significantly excellent interlayer peel strength (under absolute dry conditions) which is 3% or more of the flexural strength (under absolute dry conditions). In this case, the flexural strength is evaluated according to JIS A5418 using a No.3 test piece, and a 30 by 30 mm test piece is employed in the interlayer peel test.

EXAMPLES

A method of manufacturing a calcium silicate board according to the present invention will be better understood in detail from the following description taken in conjunction with the examples and comparative examples.

Example 1 and Comparative Example 1

Manufacturing examples of calcium silicate hydrate slurries essentially consisting of an amorphous material:

Slurries essentially consisting of an amorphous material were obtained as follows: calcium hydroxide and silica sand were blended according to formulations shown in Table 1; each of the mixtures was mixed with 13 times the amount of water and stirred; then each of the resultant mixtures was subjected to a hydrothermal reaction according to the corresponding conditions shown in Table 1. An autoclave for experimental use was employed for the hydrothermal reaction.

TABLE 1

| | Experimental No. | | | | | |
|---|---|---|---|---|---|---|
| | 1 | 2 | 3 | 4 | 5 | 6 |
| Materials | | | Silica Sand Calcium Hydroxide | | | |
| Ca/(Si + Al) Molar Ratio | 0.4 | 0.6 | 0.8 | 0.2 | 1.0 | 0.6 |
| Temp. (° C.) | 180 | 180 | 150 | 180 | 150 | 180 |
| Time (hr.) | 6 | 4 | 4 | 6 | 4 | 10 |
| Water Ratio | 13 | 13 | 13 | 13 | 13 | 13 |
| Stirring Rate (m/min) | 100 | 100 | 100 | 100 | 100 | 100 |
| Reaction Rate of Crystalline Silica Containing Material | 48 | 57 | 78 | 31 | 95 | 73 |
| Sedimentation Volume (ml/g) | 6.4 | 7.1 | 9.0 | 5.8 | 14.5 | 15.8 |

Materials were prepared according to formulations shown in Table 2. Each of the materials was formed into a slurry having a solid content of 10%, press-molded into 30 by 30 by 0.8 cm pieces at a press pressure of 10 kg/cm², then subjected to a hydrothermal reaction for 10 hours at 180° C. under a saturated vapor pressure.

Table 2 shows the bulk specific gravity, the flexural strength (under absolute dry conditions) and abrasion index.

TABLE 2

| | | Examples | | | | Comparative Examples | | | | |
|---|---|---|---|---|---|---|---|---|---|---|
| | | 1 | 2 | 3 | 4 | 1 | 2 | 3 | 4 | 5 |
| Formulation | Calcium Carbonate Hydrate Slurry | | | | | | | | | |
| (wt %) | Experimental No. | 1 | 2 | 3 | 1 | 2 | 4 | 5 | 6 | 2 |
| | Content (As a Solid Component) | 28 | 7 | 15 | 7 | 35 | 28 | 15 | 7 | 3 |
| | Calcium Hydroxide | 32 | 28 | 29 | 34 | 26 | 35 | 29 | 28 | 41 |
| | Silica Sand | 24 | 26 | 28 | 33 | 23 | 21 | 28 | 26 | 40 |
| | Wollastonite | 10 | 20 | 10 | 10 | 10 | 10 | 10 | 20 | 10 |
| | Perlite | — | 5 | — | — | — | — | — | 5 | — |
| | Calcium Carbonate | — | 10 | 10 | 10 | — | — | 10 | 10 | — |
| | Pulp | 5 | 3 | 7 | 5 | 5 | 5 | 7 | 3 | 5 |
| | Glass Fiber | 1 | 1 | 1 | 1 | 1 | 1 | 1 | 1 | 1 |
| Bulk Specific Gravity | | 0.55 | 0.68 | 0.63 | 0.78 | 0.48 | 0.73 | 0.61 | 0.64 | 0.82 |
| Flexural Strength (kg/cm²) | | 92 | 115 | 122 | 118 | 88 | 104 | 11 | 118 | 126 |
| Abrasion Index | | 1.8 | 0.43 | 1.1 | 0.32 | 2.3 | 0.27 | 1.4 | 1.2 | 0.20 |
| Productivity | | ○ | ○ | Δ | ○ | × | ○ | × | × | ○ |

In Table 2, the filtration rate (ml/sec) is defined as the value of filtered water (ml)/filtration time (second) when one liter of slurry, of which the concentration is 4.2% as a solid component, is put in a Büchner funnel having a diameter of 16 cm and filtered at 50 cmHg. The filtration rate of 30 or more is indicated by ○, that of 20 or more and less than 30 is indicated by Δ, and that of less than 20 is indicated by ×.

Example 2 and Comparative Example 2

Calcium hydroxide, silica sand, wollastonite, perlite, pulp, an amorphous silica containing material and a silicate material were blended according to formulations shown in Table 3, then each of the mixtures was mixed with 12 times the amount of water and stirred.

By further adding water thereto, material slurries of which the solid content was approximately 3 wt % were obtained and formed into 6 mm thick sheets by the Hatschek sheet machine process.

Then, each of the resultant green sheets was subjected to primary curing according to the conditions, i. e., the temperature and time, shown in Table 3, followed by the hydrothermal reaction for 10 hours at 180° C. under a saturated vapor pressure.

Table 3 shows peeling and bursting of the green sheets after the hydrothermal reaction, and also, the bulk specific gravity and the flexural strength of the obtained calcium silicate boards under absolute dry conditions.

ratio of 1:1, which gelation proceeded at a water ratio of 5 for 2 hours at 90° C. In the Table, the gel content is shown as a solid component.

By further adding water thereto, material slurries of which the solid content was approximately 3 wt % were obtained and formed into 6 mm thick sheets by the Hatschek sheet machine process.

Then, each of the resultant green sheets was subjected to primary curing according to the conditions, i. e., the tem-

TABLE 3

|   |   | Examples ||||||||| Comparative Examples ||||| 
|---|---|---|---|---|---|---|---|---|---|---|---|---|---|---|
|   |   | 1 | 2 | 3 | 4 | 5 | 6 | 7 | 8 | 1 | 2 | 3 | 4 | 5 |
| Formulation (%) | Calcium Hydroxide | 40 | 40 | 40 | 40 | 29 | 38 | 38 | 36 | 38 | 40 | 45 | 40 | 24 |
|   | Silica Sand | 26 | 30 | 33 | 27 | 20 | 23 | 29 | 23 | 35 | 26 | 32 | 16 | 15 |
|   | Perlite | 4 | 6 | 6 | 6 | 6 | 6 | 6 | 6 | 7 | 4 | 7 | 4 | 6 |
|   | Wollastonite | 10 | 10 | 10 | 10 | 15 | 10 | 10 | 15 | 15 | 10 | 10 | 10 | 20 |
|   | Pulp | 5 | 5 | 5 | 5 | 5 | 5 | 5 | 5 | 5 | 5 | 5 | 5 | 5 |
|   | Diatomaceous Earth | 15 | — | — | — | — | — | — | — | — | 15 | — | 25 | — |
|   | Silicon Dust | — | 9 | — | — | — | — | — | — | — | — | — | — | — |
|   | White Carbon | — | — | 6 | — | — | — | — | — | — | — | 1 | — | — |
|   | Zeolite | — | — | — | 12 | — | — | — | — | — | — | — | — | — |
|   | Calcium Carbonate | — | — | — | — | 15 | — | — | — | — | — | — | — | 20 |
|   | Montmorillonite | — | — | — | — | 10 | — | — | — | — | — | — | — | 10 |
|   | Allophane | — | — | — | — | — | 18 | — | — | — | — | — | — | — |
|   | Attapulgite | — | — | — | — | — | — | 12 | — | — | — | — | — | — |
|   | Chlorite | — | — | — | — | — | — | — | 15 | — | — | — | — | — |
| Primary Curing | Temp. (° C.) | 60 | 40 | 25 | 70 | 60 | 40 | 70 | 60 | 60 | 20 | 25 | 60 | 60 |
|   | Time (hr.) | 8 | 24 | 12 | 10 | 8 | 24 | 10 | 8 | 8 | 10 | 12 | 8 | 8 |
|   | (Temp.-15) × Time | 360 | 600 | 120 | 550 | 360 | 600 | 550 | 360 | 360 | 50 | 120 | 360 | 360 |
|   | Flexural Strength (kg/cm$^2$) | 12 | 13 | 10 | 21 | 11 | 14 | 17 | 18 | 4 | 4 | 5 | 17 | 10 |
| Peeling |   | — | — | — | — | — | — | — | — | + | + | + | — | — |
| Productivity |   | ○ | ○ | ○ | ○ | ○ | ○ | ○ | ○ | ○ | ○ | ○ | × | ○ |
| Bulk Specific Gravity |   | 0.73 | 0.80 | 0.81 | 0.84 | 0.77 | 0.75 | 0.84 | 0.83 | 0.76 | 0.73 | 0.83 | 0.70 | 0.75 |
| Flexural Strength (kg/cm$^2$) |   | 111 | 127 | 133 | 132 | 108 | 105 | 128 | 126 | 121 | 117 | 135 | 104 | 91 |

In Table 3, the specific surface area estimated by the gaseous $N_2$ absorption method is 2.0 $m^2/g$ for diatomaceous earth, 20 $m^2/g$ for silicon dust, 220 $m^2/g$ for white carbon, and 6.5 $m^2/g$ for zeolite. In addition, ○ indicates excellent productivity and x indicates inferior productivity.

Example 3 and Comparative Example 3

Each of the materials prepared according to formulations shown in Table 4 was mixed with 12 times the amount of water and stirred. The gel used here was obtained by gelation of calcium hydroxide and diatomaceous earth at a weight perature and time, shown in Table 4, followed by a hydrothermal reaction in a pressure container for 10 hours at 180° C. under a saturated vapor pressure.

Table 4 shows the flexural strength of molded bodies immediately after primary curing, the bulk specific gravity, the flexural strength, and interlayer peel strength after the hydrothermal reaction, wherein the latter two are evaluated under absolute dry conditions.

TABLE 4

|   |   | Examples ||||||||| Comparative Examples |||||
|---|---|---|---|---|---|---|---|---|---|---|---|---|---|---|
|   |   | 1 | 2 | 3 | 4 | 5 | 6 | 7 | 8 | 1 | 2 | 3 | 4 | 5 |
| Formulation (%) | Calcium Hydroxide | 32 | 30 | 17 | 17 | 23 | 31 | 33 | 31 | 32 | 28 | 15 | 30 | 19 |
|   | Silica Sand | 26 | 24 | 27 | 27 | 16 | 15 | 24 | 18 | 26 | 24 | 24 | 24 | 10 |
|   | Silicon Dust | 6 | — | — | — | — | — | — | — | 6 | — | — | — | — |
|   | Zeolite | — | 15 | — | — | — | — | — | — | — | 15 | — | 15 | — |
|   | Montmorillonite | — | — | — | — | 10 | — | — | — | — | — | — | — | 10 |
|   | Allophane | — | — | — | — | — | 18 | — | — | — | — | — | — | — |
|   | Attapulgite | — | — | — | — | — | — | 12 | — | — | — | — | — | — |
|   | Chlorite | — | — | — | — | — | — | — | 15 | — | — | — | — | — |

TABLE 4-continued

|  | | Examples | | | | | | | | Comparative Examples | | | | |
|---|---|---|---|---|---|---|---|---|---|---|---|---|---|---|
|  | | 1 | 2 | 3 | 4 | 5 | 6 | 7 | 8 | 1 | 2 | 3 | 4 | 5 |
|  | Perlite | — | 5 | — | — | 5 | — | 5 | — | — | 5 | — | 5 | 5 |
|  | Wollastonite | 10 | 10 | 10 | 10 | 15 | 10 | 10 | 10 | 10 | 10 | 10 | 10 | 20 |
|  | Pulp | 5 | 5 | 5 | 5 | 5 | 5 | 5 | 5 | 5 | 7 | 5 | 5 | 5 |
|  | Glass Fiber | 1 | 1 | 1 | 1 | 1 | 1 | 1 | 1 | 1 | 1 | 1 | 1 | 1 |
|  | Portland Cement | — | — | 20 | 20 | — | — | — | — | — | — | 25 | — | — |
|  | Calcium Carbonate | — | — | — | — | 15 | — | — | — | — | — | — | — | 20 |
|  | Gel | 20 | 10 | 20 | 20 | 10 | 20 | 10 | 20 | 20 | 10 | 20 | 10 | 10 |
| Primary | Temp. (° C.) | 50 | 70 | 50 | 15 | 60 | 40 | 70 | 60 | — | 30 | 30 | 15 | 60 |
| Curing | Time (Hr.) | 12 | 3 | 8 | 24 | 8 | 24 | 10 | 8 | | 8 | 8 | 24 | 8 |
| Flexural Strength Immediately After | | 4.8 | 4.5 | 4.8 | 4.9 | 4.6 | 4.5 | 4.8 | 4.4 | 4.8 | 6.4 | 5.1 | 4.4 | 4.6 |
| Flexuarl Strength After Primary Curing: (2) | | 7.1 | 12.0 | 8.5 | 7.2 | 10.8 | 7.4 | 12.4 | 13.8 | 5.0 | 7.1 | 7.0 | 5.5 | 9.9 |
| (2)/(1) | | 1.48 | 2.67 | 1.77 | 1.47 | 2.35 | 1.64 | 2.58 | 3.14 | :1.04 | 1.11 | 1.37 | 1.25 | 2.15 |
| Bulk Specific Gravity | | 0.63 | 0.65 | 0.69 | 0.69 | 0.66 | 0.63 | 0.65 | 0.64 | 0.63 | 0.65 | 0.72 | 0.65 | 0.66 |
| Flexural Strength: (3) (kg/cm$^2$) | | 84 | 83 | 98 | 92 | 90 | 82 | 87 | 86 | 68 | 92 | 103 | 80 | 88 |
| Interlayer Peel Strength: (4) (kg/cm$^2$) | | 3.1 | 4.9 | 7.9 | 5.0 | 4.8 | 3.4 | 7.2 | 6.8 | 0.3 | 0.9 | 6.7 | 0.8 | 4.6 |
| (4)/(3) (%) | | 3.7 | 5.9 | 8.1 | 5.4 | 5.3 | 4.1 | 8.3 | 7.9 | 0.44 | 0.98 | 6.5 | 1.00 | 5.2 |
| Peeling During Hydrothermal Reaction | | — | — | — | — | — | — | — | — | + | + | — | + | — |

In Table 4, the specific surface area estimated by the gaseous $N_2$ absorption method is 20 m$^2$/g for silicon dust, 6.5 m$^2$/g for zeolite, and 2.0 m$^2$/g for diatomaceous earth.

ADVANTAGES

By a method of manufacturing a calcium silicate according to the first aspect of the present invention, a calcium silicate board can be produced, which has excellent matrix strength and abrasion resistance in spite of the fact that the bulk specific gravity thereof is in a range of from 0.5 to 0.8.

By a method of manufacturing a calcium silicate board according to the third aspect of the present invention, it is possible to improve the strength of the green sheet obtained by forming a material slurry into a prescribed shape, thereby preventing the green sheet from peeling, bursting or the like during the hydrothermal reaction.

By a method of manufacturing a calcium silicate board according to the fourth to sixth aspects of the present invention, it is possible to improve the strength of the green sheet obtained by forming a material slurry into a prescribed shape. The green sheet is thereby prevented from peeling, bursting or the like during the hydrothermal reaction and the interlayer peel strength of the obtained calcium silicate board having a bulk specific gravity of 0.70 or less is improved.

What is claimed is:

1. A method of manufacturing a calcium silicate board comprising:

a step of forming a material slurry into a prescribed shape of a molded body, said material slurry comprising 5 to 30 wt % of calcium silicate hydrate slurry as a solid component, 17 to 50 wt % of calcareous material, 13 to 45 wt % of silica containing material, 2 to 8 wt % of fiber material and 5 to 40 wt % of inorganic fillers;

wherein said calcium silicate hydrate slurry consists essentially of an amorphous material and is obtained by a hydrothermal reaction of a slurry, comprising said calcareous material and a crystalline silica containing material of which a Ca/(Si+Al) molar ratio is 0.3 to 0.8, added with water under conditions that a reaction rate of said crystalline silica containing material is 40 to 80% at a saturated vapor pressure, and said calcium silicate hydrate slurry has a sedimentation volume of 5 to 14 ml/g, and a step of hydrothermally reacting the obtained molded body in a pressure container.

2. A calcium silicate board manufactured by a method as set forth in claim 1, wherein said calcium silicate board has a bulk specific gravity ranging from 0.5 to 0.8 and an abrasion index ranging from 0.3 to 2.

3. A method of manufacturing a light-weight calcium silicate board comprising;

a step of forming a material slurry into a prescribed shape of a molded body, said material slurry comprising, as a solid component, 17 to 50 wt % of calcareous material, 15 to 45 wt % of silica containing material, 2 to 8 wt % of fiber material and 5 to 40 wt % of inorganic fillers; and a step of hydrothermally reacting the obtained molded body in a pressure container, wherein 2 to 20 wt % of at least one kind of amorphous silica containing material or silica material, each having a specific surface area of 1 m$^2$/g or more, is used as a portion of said silica containing material; and, before said hydrothermal reaction, said molded body is subjected to primary curing under conditions represented by a formula (curing temperature—15)×curing time≧120° C.·hr.

4. A method of manufacturing a calcium silicate board having a bulk specific gravity of 0.70 or less comprising:

a step of forming a material slurry in layers by a sheet machine process and forming a molded body therefrom, said material slurry comprising, as a solid component, 5 to 35 wt % of calcareous material, 5 to 40 wt % of silica containing material, 2 to 8 wt % of fiber material, 5 to 40% of inorganic fillers, and a gel obtained from 2 to 20 wt % of calcareous material for gelation and 3 to 25 wt % of silica containing material for gelation; and a step of a hydrothermally reacting the obtained molded body in a pressure container, wherein 2 to 20 wt % of at least one kind of amorphous silica containing material or silicate material, each having a specific surface area of 1 m$^2$/g or more, is used as a portion of said silica containing material; and, before said hydrothermal reaction, said molded body is subjected to primary curing under conditions represented by a formula (curing temperature—15)×curing time≧120° C.·hr. so that a flexural strength of said molded body under a wet condition is 7 kg/cm$^2$ or more and is 1.3 times higher than that before primary curing.

5. A method of manufacturing a calcium silicate board having a bulk specific gravity of 0.70 or less comprising;

a step of forming a material slurry in layers by a sheet machine process and forming a molded body therefrom, said material slurry comprising, as a solid component, 5 to 35 wt % of calcareous material, 5 to 40 wt % of silica containing material, 2 to 8 wt % of fiber material, 5 to 40% of inorganic fillers, and a gel obtained from 2 to 20 wt % of calcareous material for gelation and 3 to 25 wt % of silica containing material for gelation; and a step of a hydrothermally reacting the obtained molded body in a pressure container, wherein 2 to 20 wt % of at least one kind of amorphous silica containing material or silicate material, each having a specific surface area of 1 $m^2$/g or more, is used as a portion of said silica containing material; further, said material slurry contains 20 wt % or less of a curing agent selected from the group consisting of Portland cement, alumina cement and granulated blast furnace slag; and, before said hydrothermal reaction, said molded body is subjected to primary curing under conditions represented by a formula (curing temperature—10)×curing time≧120° C.·hr. so that a flexural strength of said molded body under a wet condition is 7 kg/$cm^2$ or more and is 1.3 times higher than that before primary curing.

6. A method of manufacturing a calcium silicate board having a bulk specific gravity of 0.70 or less comprising;

a step of forming a material slurry in layers by a sheet machine process and forming a molded body therefrom, said material slurry comprising, as a solid component, 5 to 35 wt % of calcareous material, 5 to 40 wt % of silica containing material, 2 to 8 wt % of fiber material, 5 to 40 wt % of inorganic fillers, and a gel obtained from 2 to 20 wt % of calcareous material for gelation and 3 to 25 wt % of silica containing material for gelation; and a step of a hydrothermally reacting the obtained molded body in a pressure container, wherein said material slurry contains 20 wt % or less of a curing agent selected from the group consisting of Portland cement, alumina cement and granulated blast furnace slag; and, before said hydrothermal reaction, said molded body is subjected to primary curing under conditions represented by a formula (curing temperature—10)×curing time≧120° C.·hr. so that a flexural strength of said molded body under a wet condition is 7 kg/$cm^2$ or more and is 1.3 times higher than that before primary curing.

7. A calcium silicate board having a bulk specific gravity of 0.70 or less manufactured by a method as set forth in claim 4, wherein said calcium silicate board has an interlayer peel strength of 3% or more of the flexural strength.

8. A calcium silicate board having a bulk specific gravity of 0.70 or less manufactured by a method as set forth in claim 5, wherein said calcium silicate board has an interlayer peel strength of 3% or more of the flexural strength.

9. A calcium silicate board having a bulk specific gravity of 0.70 or less manufactured by a method as set forth in claim 6, wherein said calcium silicate board has an interlayer peel strength of 3% or more of the flexural strength.

* * * * *